(12) United States Patent
Wu et al.

(10) Patent No.: US 9,026,863 B2
(45) Date of Patent: May 5, 2015

(54) REPLACEMENT OF STORAGE RESPONSIVE TO REMAINING LIFE PARAMETER

(71) Applicant: Dell Products L.P., Round Rock, TX (US)

(72) Inventors: Frank Widjaja Wu, Austin, TX (US); Ricardo V. Dominguez, Georgetown, TX (US); Santosh Kumar, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 136 days.

(21) Appl. No.: 13/743,552

(22) Filed: Jan. 17, 2013

(65) Prior Publication Data

US 2014/0201576 A1 Jul. 17, 2014

(51) Int. Cl.
G06F 11/00 (2006.01)
G06F 11/30 (2006.01)
G06F 11/07 (2006.01)
G06F 11/20 (2006.01)

(52) U.S. Cl.
CPC ........ G06F 11/3058 (2013.01); G06F 11/0754 (2013.01); *G06F 11/3034* (2013.01); G06F 11/2094 (2013.01)

(58) Field of Classification Search
None
See application file for complete search history.

(56) References Cited

U.S. PATENT DOCUMENTS

| | | | |
|---|---|---|---|
| 6,598,174 B1 * | 7/2003 | Parks et al. | 714/6.22 |
| 7,574,623 B1 * | 8/2009 | Goel et al. | 714/47.2 |
| 2002/0091965 A1 * | 7/2002 | Moshayedi | 714/8 |
| 2005/0114728 A1 * | 5/2005 | Aizawa et al. | 714/6 |
| 2005/0262385 A1 * | 11/2005 | McNeill et al. | 714/5 |
| 2005/0268147 A1 * | 12/2005 | Yamamoto et al. | 714/2 |
| 2005/0283655 A1 * | 12/2005 | Ashmore | 714/7 |
| 2008/0250267 A1 * | 10/2008 | Brown et al. | 714/4 |
| 2009/0063895 A1 * | 3/2009 | Smith | 714/7 |
| 2009/0204852 A1 * | 8/2009 | Diggs et al. | 714/42 |
| 2009/0204853 A1 * | 8/2009 | Diggs et al. | 714/47 |
| 2010/0262792 A1 * | 10/2010 | Hetzler et al. | 711/156 |
| 2010/0306577 A1 * | 12/2010 | Dreifus et al. | 714/6 |
| 2011/0173378 A1 * | 7/2011 | Filor et al. | 711/103 |
| 2013/0179631 A1 * | 7/2013 | Cepulis | 711/103 |

OTHER PUBLICATIONS

Kadav et al., "Differential RAID: Rethinking RAID for SSD Reliability", 2010, ACM SIGOPS Operating Systems Review, pp. 55-59.*

* cited by examiner

Primary Examiner — Gabriel Chu
(74) Attorney, Agent, or Firm — Isidore PLLC (57) ABSTRACT

A method of operating a storage system. The method includes a storage controller receiving a first life parameter of a first storage device and determining if the first life parameter indicates that the first storage device has a remaining life that is less than a pre-determined life parameter threshold. The method further includes, in response to the remaining life being less than the pre-determined life parameter threshold, designating the first storage device for replacement.

17 Claims, 5 Drawing Sheets

REPLACEMENT OF STORAGE RESPONSIVE TO REMAINING LIFE PARAMETER

BACKGROUND

1. Technical Field

The present disclosure generally relates to storage systems for data and in particular to improving solid state storage system reliability.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with remote or cloud storage systems. The remote or cloud storage systems can include redundant arrays of independent drives (RAID) that use hard disk drives or solid state storage drives. RAID systems balance the storage of data across the drive in the system to improve performance and reliability. Improvement of the storage system is achieved by balancing write load across the disk drives.

While the load balancing features of RAID storage schemes such as RAID-5 work well for hard disk drives, they cause several disadvantages when used with solid state drives. Non-volatile memory devices such as NAND flash memory devices have a limited number of write or program erase (P/E) cycles to each cell after which the cell is unusable. Over time, the memory cells wear out due to the repeated application of electrical currents causing breakdown of insulating layers within the transistors. Typical NAND flash memory devices can withstand around 100,000 P/E cycles. After the P/E cycle life is exceeded, worn out cells can deteriorate the integrity of the storage causing loss of data. Data written to worn out cells can be lost. Each solid state drive has a maximum number of program/erase cycles called the endurance life. Once the endurance life of the solid state drive is exceeded, data can no longer reliably be written to the drive.

The load balancing features of RAID storage schemes cause the solid state drives in a solid state storage system to wear at the same rate. This lock step wear schedule can cause the solid state drives in a solid state storage system to all approach their endurance life at approximately the same time, leaving the storage system vulnerable to multiple drive failures at the same time. Thus, the present storage systems do not provide adequate protection for the operation of solid state drives.

BRIEF SUMMARY

Disclosed is a method, a storage system, and an information handling system (IHS) that enables (1) consumable non-volatile storage devices, such as solid state storage devices, to be designated for replacement on a staggered basis such that all of the storage devices do not reach their end of life at the same time and that enables (2) storage devices to be autonomously designated for replacement based on controller-level analysis of life parameters transmitted from the solid state storage devices.

According to a one embodiment, the method comprises: a storage controller receiving a first life parameter of a first storage device; determining if the first life parameter indicates that the first storage device has a remaining life that is less than a pre-determined life parameter threshold; and in response to the remaining life being less than the pre-determined life parameter threshold, designating the first storage device for replacement.

Also disclosed is a storage system, comprising: a plurality of storage devices; and a storage controller coupled to the storage devices for controlling storage operations. The storage controller comprises logic that: receives a first life parameter of a first storage device; determines if the first life parameter indicates that the first storage device has a remaining life that is less than a pre-determined life parameter threshold; and in response to the remaining life being less than the pre-determined life parameter threshold, designates the first storage device for replacement.

Also disclosed is an information handling system (IHS) comprising: one or more processors; a storage system coupled to the one or more processors and in communication with the one or more processors, the storage system comprising: a plurality of storage devices and a storage controller coupled to the storage devices, the storage controller having firmware executing thereon to provide control of storage system operations wherein the firmware configures the storage controller to: receive a first life parameter of a first storage device; determine if the first life parameter indicates that the first storage device has a remaining life that is less than a pre-determined life parameter threshold; and in response to the remaining life being less than the pre-determined life parameter threshold, designate the first storage device for replacement.

According to one or more embodiments, the storage devices are consumable, non-volatile storage devices and include solid state storage devices.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system (IHS), a solid state storage system and a method performed within the information handling system that enables (1) consumable, non-volatile storage devices, including certain types of solid state storage devices, to be designated for replacement on a staggered basis such that all of the storage devices do not reach their end of life at the same time and that enables (2) storage devices to be designated for replacement based on life parameters transmitted from the storage devices. For purposes of the disclosure, the storage devices are described generally as solid state storage devices; however, it is appreciated that the various aspects of the described embodiments are applicable to any time of consumable storage device, with a discernible or detectable lifecycle.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
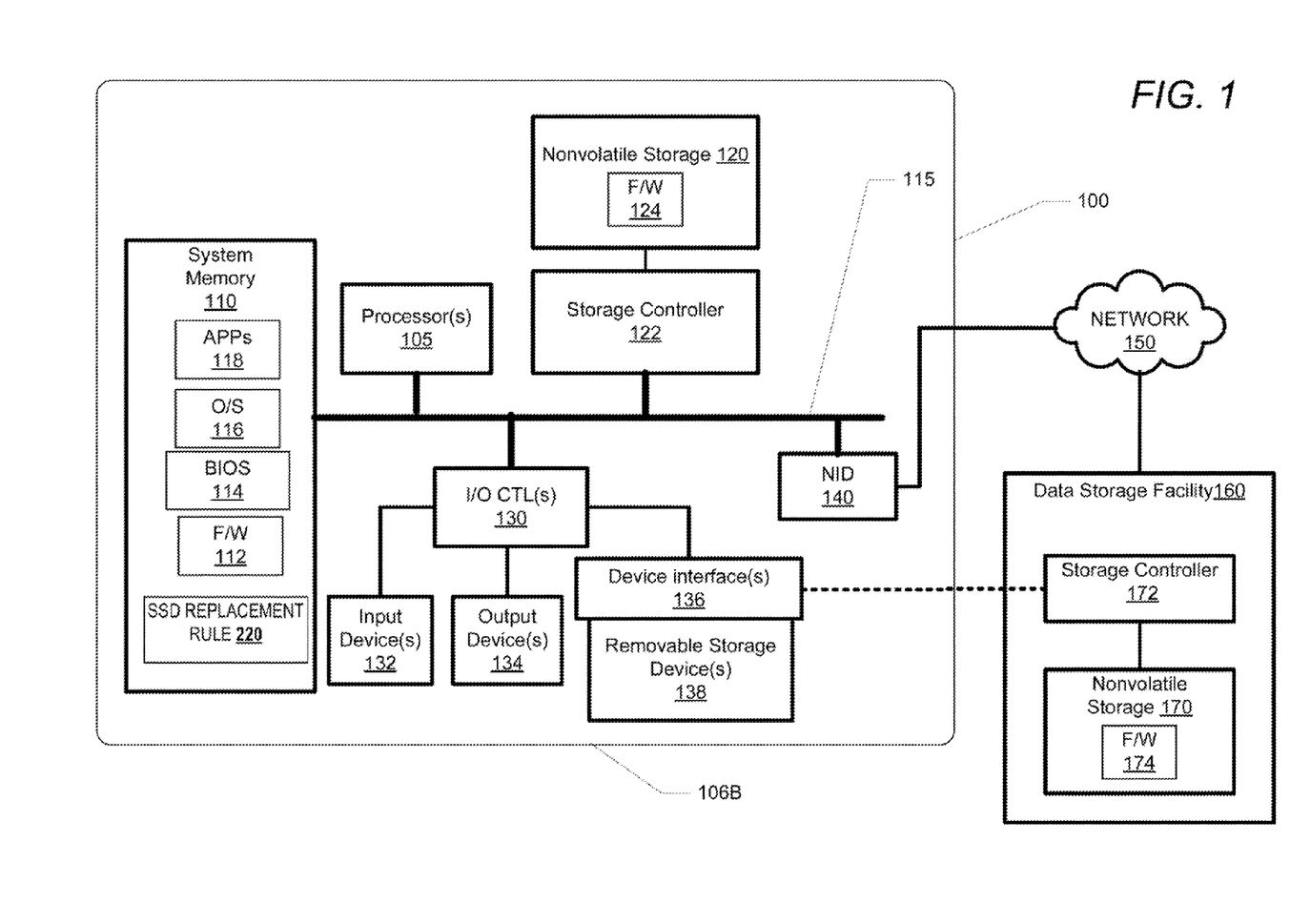
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a storage controller 122 coupled to nonvolatile storage 120 within which can be stored software and/or firmware 124 and one or more sets of data (not specifically shown). As shown, system memory 110 can include therein a plurality of modules, including firmware (F/W) 112, basic input/output system (BIOS) 114, operating system (O/S) 116, and application(s) 118. System memory 110 further includes a solid state drive replacement rule 220 that is used to determine when solid state drives are to be replaced. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removal storage device(s) 138, such as a compact disk (CD), digital video disk (DVD), flash drive, or flash memory card. In one or more embodiments, device interface(s) 136 can also provide an integration point for connecting other device(s) to IHS 100. In such implementation, device interfaces 136 can further include General Purpose I/O interfaces such as $I^2C$, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of hard disk drives, solid state storage drives, solid state storage devices or other storage media. In one embodiment, data storage facility 160 is a redundant array of solid state storage media. Data storage facility 160 includes a storage controller 172 coupled to nonvolatile storage 170 within which can be stored software and/or firmware 174 and one or more sets of data (not specifically shown). In an alternate embodiment, and as represented by the second set of dashed interconnecting lines, data storage facility 160 can be directly connected to IHS 100 as an external storage device.

Figure 2:
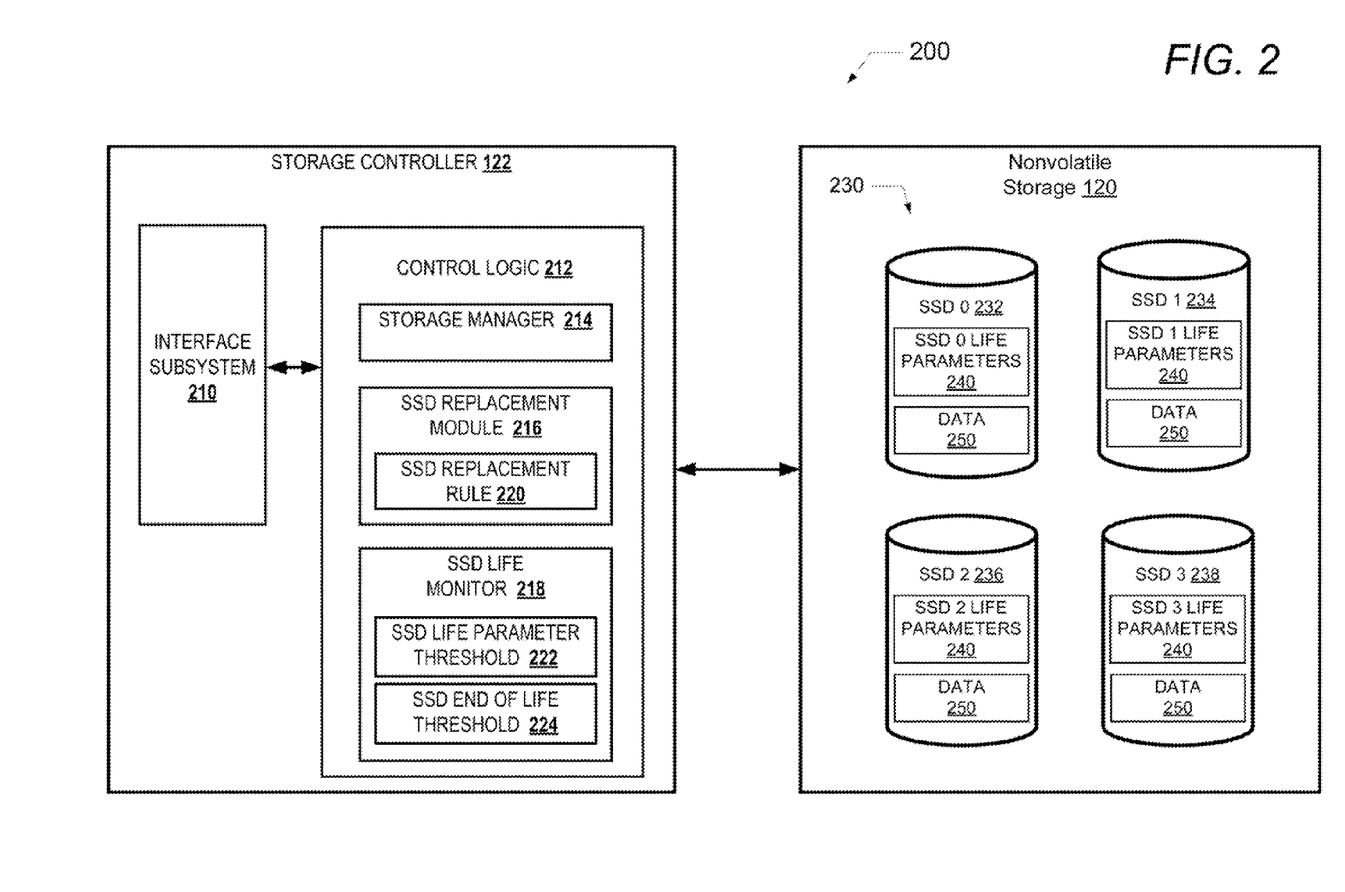
FIG. 2 illustrates a block diagram of an example storage system, in accordance with one or more embodiments.

With reference now to FIG. 2, there is illustrated one embodiment of storage subsystem 200 that can be utilized within IHS 100 and/or data facility 160 to store data, software and firmware. In the discussion of FIG. 2, reference is also made to elements described in FIG. 1. Storage subsystem 200 generally includes nonvolatile storage 120 and storage controller 122 that controls and manages the flow of commands and data to and from nonvolatile storage 120. Storage subsystem 200 can also represent nonvolatile storage 170 and storage controller 172 of data storage facility 160.

In one embodiment, nonvolatile storage 120 comprises an array 230 of consumable solid state storage devices or solid state storage drives (SSD) including SSD 0 232, SSD 1 234, SSD 2, 236 and SSD 3, 238. While four solid state drives are shown, more or fewer solid state drives can be utilized within storage subsystem 200. In some embodiments, array 230 can include hundreds of solid state drives. Each of the SSDs 232-238 can comprise one or more solid state devices such as NAND flash storage chips that contain a plurality of storage blocks. Because the SSDs 232-238 use NAND flash storage devices, they are consumable solid state storage devices that will wear out over time and require replacement. SSDs 232-238 can store life parameters 240 and one or more pages and/or blocks of data 250. Life parameters 240 are generated by each of SSDs 232-238 and allow each of the solid state drives to report values that correspond to the operational life of SSDs 232-238. SSDs 232-238 can transmit life parameters 240 to storage controller 122.

Storage controller 122 contains the logic necessary to read and write to SSDs 232-238. Storage controller 122 comprises interface subsystem 210 and control logic 212. Interface subsystem 210 manages communications between control logic 212 and system interconnect 115 or data storage facility 160 of IHS 100 (FIG. 1). Control logic 212 comprises several functional modules or processes including storage manager 214, SSD replacement module 216 and SSD life monitor 218. Each of the storage controller components can communicate with each other via a communication fabric, which includes specific messaging signals communicated over specific signal lines (not illustrated). Functions, modules, routines, methods and processes of the present disclosure can be provided as firmware code and/or logic within storage controller 122. The firmware code and logic can implement storage manager 214, SSD replacement module 216 and SSD life monitor 218.

Storage manager 214 manages the reading and writing of data to SSDs 232-238 and can include data distribution techniques to improve storage reliability such as redundant array of independent drives (RAID). SSD replacement module 216 determines when each of the SSDs within array 230 is to be designated for replacement. SSD replacement module 216 includes a SSD replacement rule 220 that is used to implement a replacement schedule for SSDs 232-238. In one embodiment, SSD replacement rule 220 can be pre-determined and stored within system memory 110, nonvolatile storage 120 or nonvolatile storage 170. SSD replacement rule 220 can be transmitted between system memory 110 and control logic 212. In one embodiment, SSD replacement rule 220 can be pre-determined by a user and stored in system memory 110 or within a local storage facility of storage controller 122. In another embodiment, SSD replacement rule 220 can vary and be dynamically determined by SSD replacement module 216. In an additional embodiment, an initial SSD replacement rule 220 can be transmitted from system memory 110 to SSD replacement module 216. SSD replacement module 216 can then modify the initial SSD replacement rule into a new SSD replacement rule based on life parameters and other characteristics of the storage devices being controlled by the storage controller 122.

SSD life monitor 218 monitors and checks the SSD life parameters 240 generated by SSDs 232-238. SSD life monitor 218 includes one or more SSD life parameter threshold 222, which are values that are used to identify and designate SSDs within array 230 for replacement. SSD life monitor 218 also includes one or more values for SSD end of life threshold 224 that are used to identify SSDs that are at the end of their life cycle and need to transfer their data to another solid state drive before failure. In one embodiment, SSD replacement module 216 determines the SSD life parameter threshold 222 values based on SSD replacement rule 220. According to one aspect of the disclosure, SSD life monitor 218 identifies SSDs within nonvolatile storage 120 for replacement based on one or more of SSD life parameters 240 received by control logic 212.

Those of ordinary skill in the art will appreciate that the hardware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/ components may be used in addition to or in place of the hardware depicted. The depicted examples do not convey or imply any architectural or other limitations with respect to the presently described embodiments and/or the general disclosure.

Figure 3:
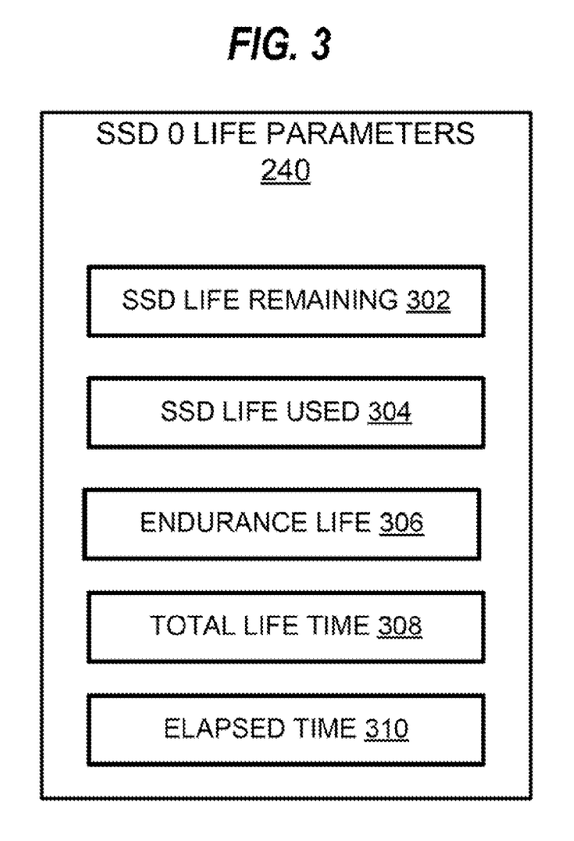
FIG. 3 illustrates an example of solid state drive life parameters, in accordance with one or more embodiments.

FIG. 3 illustrates further details of the SSD life parameters such as SSD 0 life parameters 240 associated with SSD 0 232. Each of the SSDs 232-238 within nonvolatile storage 120 has an associated life parameter 240. In the discussion of FIG. 3, reference is also made to elements described in FIG. 1 and FIG. 2. SSD 0 life parameters 240 comprises SSD life remaining 302, SSD life used 304, endurance life 306, total life time 308 and elapsed time 310. SSD life remaining 302 provides a value that indicates the number of remaining program/erase cycles available within the respective SSD before the total number of program/erase cycles or endurance life is exceeded. In one embodiment, SSD life remaining 302 is reported as a percentage of the endurance life. SSD life used 304 provides a value that indicates the number of used program/erase cycles that have been used within the respective SSD. In one embodiment, SSD life used 304 is reported as a percentage of the endurance life. It is appreciated that the SSD life remaining 302 and SSD life used 304 can be reported via other means, including the actual values of program/erase cycles remaining, for example. According to one aspect of the disclosure, the SSDs 232-238 can report their life parameters following initial activation of each SSDs 232-238 with storage controller 122, such as during system startup or initial power-on, or during configuration of the attached SSD 232-238 by storage controller 122. Each of the SSDs 232-238 is also configured to periodically provide an indication of its life status within a status report that is generated and forwarded to the storage controller 122. In one alternate embodiment, storage controller 122 is configured to periodically request status information, which includes the life parameters, from the SSDs 232-238.

Endurance life 306 is the total number of program/erase cycles that the respective SSD is capable of performing. Total life time 308 is the total maximum number of hours in operation that the respective SSD is rated for. Elapsed time 310 is the total number of hours that the respective SSD has been in operation.

In one embodiment, SSD replacement module 216 determines the SSD life parameter threshold 222 values based on SSD replacement rule 220. In particular, SSD replacement module 216 can determine a threshold value for one or more of SSD life remaining 302, SSD life used 304, endurance life 306, total life time 308 and elapsed time 310 and store the value(s) as SSD life parameter threshold 222. Thus, depending on implementation, SSD replacement module 216 can provide a life used threshold corresponding to life used 304, a life remaining threshold corresponding to life remaining 302, an endurance life threshold corresponding to endurance life 306, a total life time threshold corresponding to total life time 308, and/or an elapsed time threshold corresponding to elapsed time 310.

Figure 4:
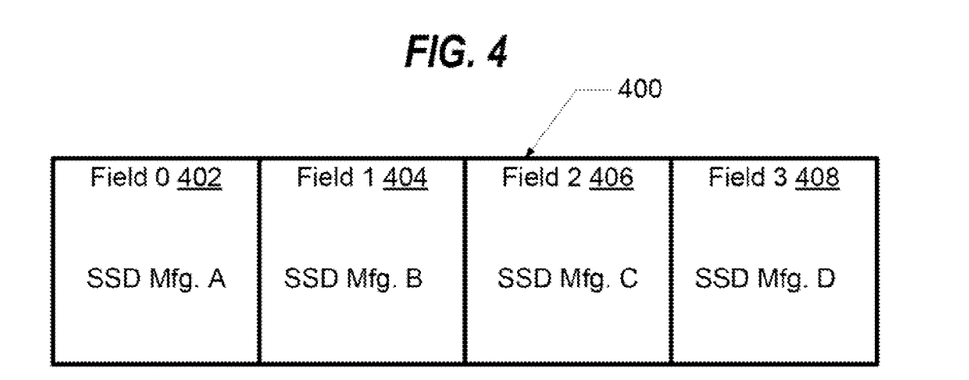
FIG. 4 illustrates an example memory page containing data fields associated with different solid state drive manufacturers, in accordance with one or more embodiments.

Turning to FIG. 4, there is illustrated an example memory page (or table) 400 that contains fields associated with different solid state drive manufacturers. In the discussion of FIG. 4, reference is also made to elements described in FIG. 1 and FIG. 2. Memory page 400 can be stored in system memory 110 and transmitted to storage controller 122 or programmed into storage controller 122. Memory page 400 is utilized for situations in which the SSDs 232-238 that are being controlled by storage controller 122 (a) report life parameter values in a periodically generated device status report that contains a plurality of different fields, where (b) the life parameters values can be communicated in different fields based on the SSD manufacturers. In other words, the fields of the different status reports across different SSD manufacturers are not all configured for the same usage. Memory page 400 contains field 0 402, field 1 404, field 2 406, and field 3 408, representing an example sequence of fields in a status report that can be generated from each SSD. In this example, each SSD 232-238 provides/reports its life parameter in a different field of the generated status report received by storage controller 122. Field 0 402 contains life parameters 240 associated with solid state drive manufacturer A. Field 1 404 contains life parameters 240 associated with solid state drive manufacturer B. Field 2 406 contains life parameters 240 associated with solid state drive manufacturer C. Field 3 408 contains life parameters 240 associated with solid state drive manufacturer D. Thus, in the case where nonvolatile storage 120 contains solid state drives from several different manufacturers, memory page 400 allows control logic 212 to map different models of solid state drives produced by different manufacturing companies to their respective, associated life parameters 240 reported within each status report that is received from a specific one of the sold state drive.

Figure 5:
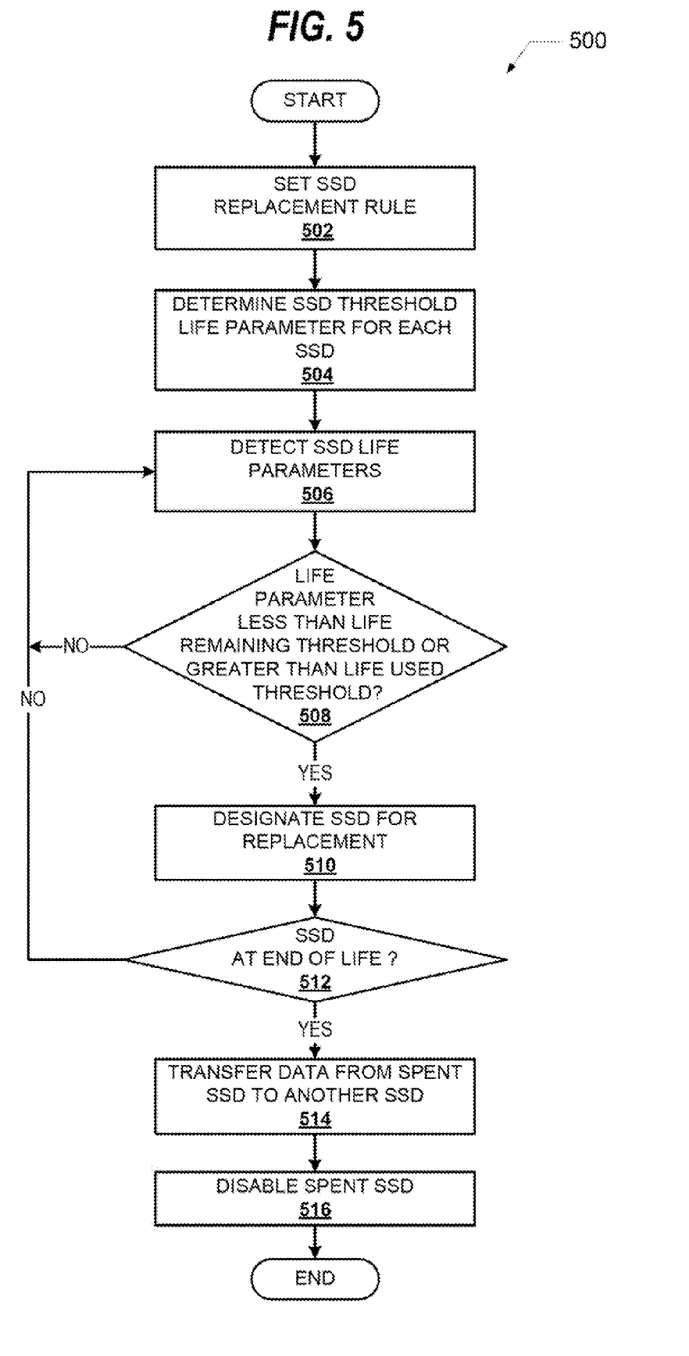
FIG. 5 is a flow chart illustrating one example of the method by which solid state drives are designated for replacement, according to one or more embodiments.
Figure 6:
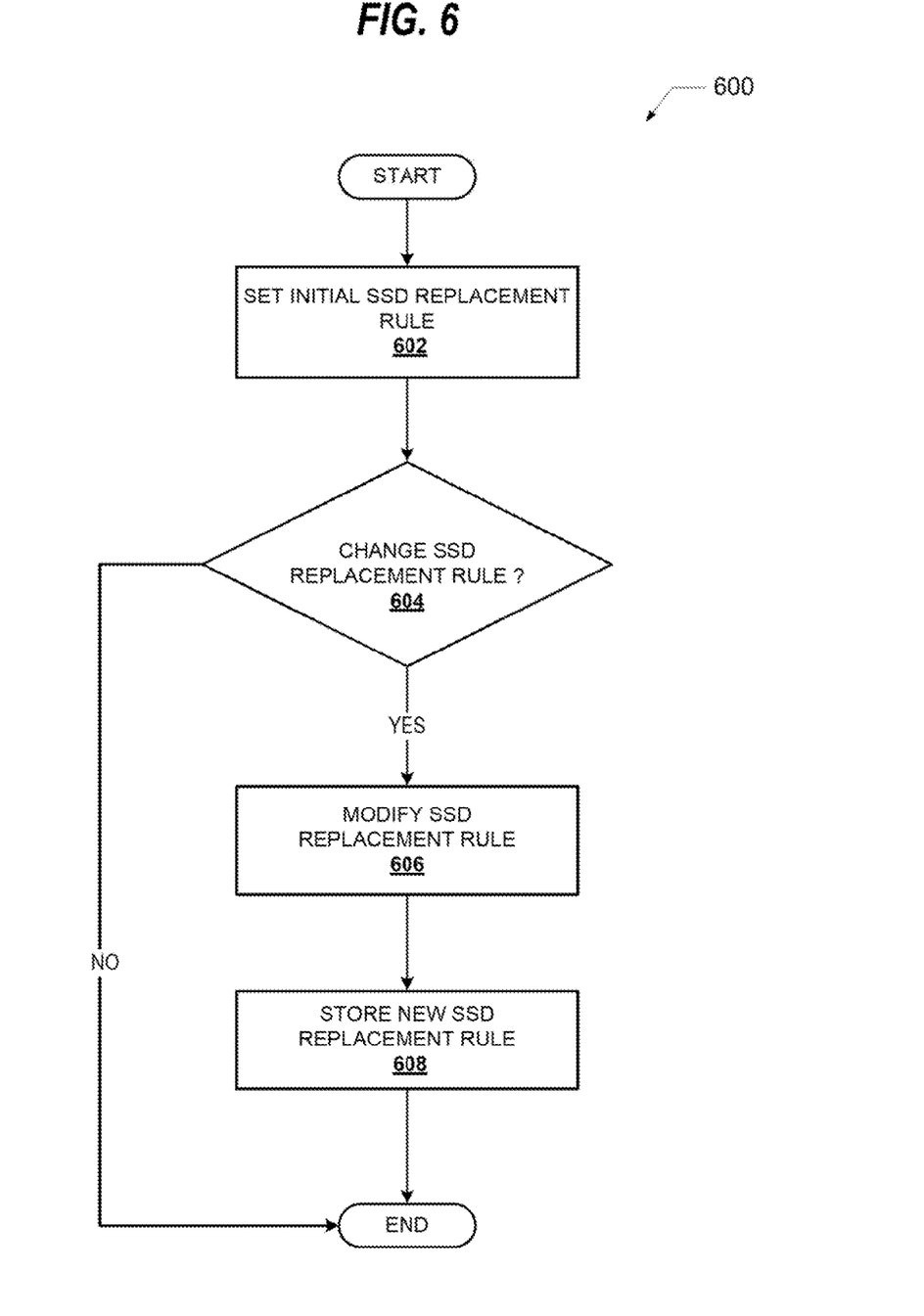
FIG. 6 is a flow chart illustrating one example of the method by which solid state drive replacement rules are modified, according to one or more embodiments.

FIG. 5 and FIG. 6 illustrate flowcharts of exemplary methods by which IHS 100 and storage controller 122, presented within the preceding figures, perform different aspects of the processes that enable one or more embodiments of the disclosure. Generally, method 500 and method 600 collectively represent memory/storage controller implemented methods to identify solid state drives for replacement and to perform a staggered solid state drive replacement schedule. The description of each method is provided with general reference to the specific components illustrated within the preceding figures. Generally each method is described as being implemented via control logic 212 and particularly the execution of code provided by software/firmware 124/174 acting within modules 216 and 218. It is however appreciated that certain aspects of the described methods may be implemented via other processing devices and/or execution of other code. In the discussion of FIG. 5 and FIG. 6, reference is also made to elements described in FIG. 1-FIG. 3.

FIG. 5 illustrates an example method by which solid state drives SSDs 232-238 are designated for replacement within nonvolatile storage 120. Method 500 begins at the start block and proceeds to block 502 where SSD replacement module 216 sets the SSD replacement rule 220 for the solid state drives being controlled by storage controller 122. In one embodiment, SSD replacement rule 220 is pre-determined and stored in system memory 110 and transmitted to SSD replacement module 216. SSD replacement rule 220 implements a staggered SSD replacement schedule such that SSDs 232-238 do not all reach their maximum endurance life at approximately the same time. In one embodiment, SSD replacement rule 220 can require that less than 30 percent of the total number of solid state drives have a SSD life remaining 302 percentage less than 40 percent and that less than 15 percent of the total number of solid state drives have a percentage of SSD life remaining 302 less than 20 percent. In another embodiment, SSD replacement rule 220 can require that less than 25 percent of the total number of solid state drives have a SSD life remaining 302 percentage less than 30 percent. In another embodiment, SSD replacement rule 220 can require that less than 30 percent of the total number of solid state drives has a percentage of SSD life used 304 greater than 70 percent. In other embodiments, SSD replacement rule 220 can be based on endurance life 306, total life time 308 or elapsed time 310.

SSD replacement module 216 determines the SSD life parameter threshold 222 for each of the solid state drives 232-238 (block 504) based on the SSD replacement rule 220. For example, in one embodiment, the SSD life parameter threshold 222 can be set at 25 percent of the SSD life remaining 302. In another embodiment, the SSD life parameter threshold 222 can be set at 75 percent of the SSD life used 304. SSD life monitor 218 detects the SSD life parameters 240 that are transmitted by each of the solid state drives 232-238 in nonvolatile storage 120 (block 506).

SSD life monitor 218 determines at block 508 if one or more of the SSD life parameters 240 are greater than or less than the SSD life parameter threshold 222. In the example where the life parameter 240 is the SSD life remaining 302, SSD life monitor 218 determines at block 508 if the SSD life remaining 302 value is greater than the SSD life parameter threshold 222 value. In the example where the life parameter 240 is the SSD life used 304, SSD life monitor 218 determines at block 508 if the SSD life used 304 value is less than the SSD life parameter threshold 222 value. In another embodiment, the life parameter 240 used in block 508 can be the elapsed time 310 of operation for the SSD.

In response to the life parameter 240 not being less than or greater than the SSD life parameter threshold 222, (i.e., SSD life remaining 302 is greater than SSD life parameter (remaining) threshold 222 and/or SSD life used 304 is less than SSD life parameter (used) threshold 222), SSD life monitor 218 continues detecting or monitoring SSD life parameters 240 for SSDs 232-238 (block 506). In response to the life parameter 240 being less than or greater than the SSD life parameter threshold 222, (i.e., SSD life remaining 302 is less than SSD life parameter (remaining) threshold 222 and/or SSD life used 304 is greater than SSD life parameter (used) threshold 222), SSD life monitor 218 indicates or designates the respective SSDs 232-238 for replacement with a new SSD (block 510).

SSD life monitor 218 determines at block 512 if the SSD designated for replacement is at its end of life. According to one or more embodiments, SSD life monitor 218 determines if the SSD designated for replacement is at its end of life based a comparison of life parameters 240 to SSD end of life threshold 224. In the example where the life parameter 240 is the SDD life remaining 302, SSD life monitor 218 determines at block 512 if the SSD life remaining 302 value is greater than the SSD end of life threshold 224 value. In the example where the life parameter 240 is the SDD life used 304, SSD life monitor 218 determines at block 512 if the SSD life used 304 value is less than the SSD end of life threshold 224 value.

In response to the SSD not being at the end of its life, SSD life monitor 218 continues detecting or monitoring SSD life parameters 240 for SSDs 232-238 (block 506). In response to the SSD being at the end of its life, SSD life monitor 218 transfers the data 250 at block 514 from the identified spent SSD to another one of SSDs 232-238 that has sufficient capacity to store data 250. In one embodiment, the selection of the SSD to which the data is transferred involves a secondary determination of which SSD(s) with sufficient storage capacity has a best life remaining or life used value in order to maximize the time between data transfers and/or minimize and amount of cross-device transfer of data due to "end of life" scenarios. The spent SSD is then disabled (block 516). Method 500 then ends.

With reference to FIG. 6, a flow chart illustrating one embodiment of a method for modifying SSD replacement rules is shown. Method 600 begins at the start block and proceeds to block 602 where SSD replacement module 216 sets the initial SSD replacement rule 220. In one embodiment, the initial SSD replacement rule 220 can be pre-determined and transmitted from system memory 110 to SSD replacement module 216. In another embodiment, the initial SSD replacement rule 220 can be dynamically determined by SSD replacement module 216, based on the number and capacity of the solid state drives and other characteristics and/or factors that can affect the operation of the individual drives and/or the overall storage system. SSD replacement module 216 determines at block 604 if the SSD replacement rule 220 is to be changed. A change in the SSD replacement rule 220 can be triggered due to addition of one or more solid state devices to the storage system, failure of one or more of the solid state devices in the storage system, receipt of external inputs to adjust or modify one or more life parameters of one or more of the solid state devices, receipt of internal input to modify overall replacement rule parameters, such as the threshold values, addition of a different type of solid state device, e.g., from a different manufacturer, and other detected changes.

In response to the SSD replacement rule 220 not being changed, method 600 ends. In response to the SSD replacement rule 220 being changed, SSD replacement module 216 modifies the SSD replacement rule 220 to generate a new SSD replacement rule 220 (block 606), and SSD replacement module 216 stores the new SSD replacement rule 220 (block 608). Method 600 then terminates at the end block.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of operating a storage system, the method comprising:

a storage controller receiving a first life parameter of a first storage device;

determining if the first life parameter indicates that the first storage device has a remaining life that is less than a pre-determined life parameter threshold;

in response to the remaining life being less than the pre-determined life parameter threshold, designating the first storage device for replacement;

in response to designating the first storage device for replacement, determining if the first storage device is at an end of life;

in response to the first storage device being at the end of life, transferring data from the first storage device to a second storage device that has a remaining life which is not less than a corresponding life remaining parameter threshold for that second storage device; and in response to completion of the transferring of the data to the second storage device, disabling the first storage device.

2. The method of claim 1, wherein:

the storage system is a solid state storage system and comprises: a plurality of consumable non-volatile solid state storage devices, each of the consumable non-volatile solid state storage devices having an associated life parameter; and the method further comprises setting a life parameter threshold for each of the consumable non-volatile solid state storage devices based on a storage device replacement rule.

3. The method of claim 1, further comprising:

determining the pre-determined life parameter threshold based on a storage device replacement rule, the storage device replacement rule providing at least one of a life used threshold, a life remaining threshold, an endurance life threshold, a total life time threshold and an elapsed time threshold.

4. The method of claim 1, further comprising:

setting an initial storage device replacement rule for each of the storage devices; and in response to receiving a modification to at least one initial storage device replacement rule, changing the initial storage device replacement rule to a new storage device replacement rule for the particular storage device, storing the new storage device replacement rule, and subsequently implementing the new storage device replacement rule for that particular storage device.

5. The method of claim 1, further comprising:

receiving, by the storage controller, a life parameter from each storage device within the solid state storage system, wherein each storage device is configured to periodically transmit a life parameter of the particular storage device to a connected storage controller.

6. The method of claim 1, further comprising:

periodically transmitting a request for a current life parameter value from each storage device that is connected to the storage controller, wherein each storage device is configured to transmit its life parameter in response to receiving the request from a connected storage controller.

7. A storage system comprising:

a plurality of storage devices;

a storage controller coupled to the storage devices for controlling storage operations of the storage system, wherein the storage controller comprises logic that:

receives a first life parameter of a first storage device;

determines if the first life parameter indicates that the first storage device has a remaining life that is less than a pre-determined life parameter threshold;

in response to the remaining life being less than the pre-determined life parameter threshold, designates the first storage device for replacement;

in response to designating the first storage device for replacement, determines if the first storage device is at an end of life;

in response to the first storage device being at the end of life, transfers data from the first storage device to a second storage device that has a remaining life which is not less than a corresponding life remaining parameter threshold for the second storage device; and in response to completion of the transferring of the data to the second storage device, disables the first storage device.

8. The storage system of claim 7, wherein the storage controller further comprises logic that sets a life parameter threshold for each of the storage devices based on a storage device replacement rule and wherein the storage devices each comprise consumable non-volatile solid state storage devices.

9. The storage system of claim 7, wherein the storage controller further comprises logic that determines the pre-determined life parameter threshold based on a storage device replacement rule, the storage device replacement rule providing at least one of a life used threshold, a life remaining threshold, an endurance life threshold, a total life time threshold and an elapsed time threshold.

10. The storage system of claim 7, wherein the storage controller further comprises logic that:

sets an initial storage device replacement rule for each of the storage devices; and in response to receiving a modification to at least one initial storage device replacement rule, changes the initial storage device replacement rule to a new storage device replacement rule for the particular storage device, stores the new storage device replacement rule, and subsequently implements the new storage device replacement rule for that particular storage device.

11. The storage system of claim 7, wherein the storage controller further comprises logic that receives a life parameter from each storage device within the storage system, wherein each storage device is configured to periodically transmit a life parameter of the particular storage device to a connected storage controller.

12. The storage system of claim 7, wherein the storage controller further comprises logic that periodically transmits a request for a current life parameter value from each storage device that is connected to the storage controller, wherein each storage device is configured to transmit its life parameter in response to receiving the request from a connected storage controller.

13. An information handling system comprising:
one or more processors;
a storage system coupled to the processor and in communication with the processor, the storage system comprising: a plurality of storage devices and a storage controller coupled to the storage devices, the storage controller having firmware executing thereon to provide control of storage system operations, wherein the firmware configures the storage controller to:

receive a first life parameter of a first storage device;

determine if the first life parameter indicates that the first storage device has a remaining life that is less than a pre-determined life parameter threshold;

in response to the remaining life being less than the pre-determined life parameter threshold, designate the first storage device for replacement;

in response to designating the first storage device for replacement, determine if the first storage device is at an end of life;

in response to the first storage device being at the end of life, transfer data from the first storage device to a second storage device that has a remaining life which is not less than a corresponding life remaining parameter threshold of the second storage device; and in response to completion of the transferring of the data to the second storage device, disable the first storage device.

14. The information handling system of claim 13, wherein the firmware further configures the storage controller to set a life parameter threshold for each of a plurality of consumable, non-volatile solid state storage devices based on a device replacement rule and wherein the storage devices each comprise consumable non-volatile solid state storage devices.

15. The information handling system of claim 13, wherein the firmware further configures the storage controller to determine the pre-determined life parameter threshold based on a device replacement rule, the device replacement rule providing at least one of a life used threshold, a life remaining threshold, an endurance life threshold, a total life time threshold and an elapsed time threshold.

16. The information handling system of claim 13, wherein the firmware further configures the storage controller to receive a life parameter from each storage device within the solid state storage system, wherein each storage device is configured to periodically transmit a life parameter of the particular storage device to a connected storage controller.

17. The information handling system of claim 13, wherein the firmware further configures the storage controller to periodically transmit a request for a current life parameter value from each storage device that is connected to the storage controller, wherein each storage device is configured to transmit its life parameter in response to receiving the request from a connected storage controller.

* * * * *